July 27, 1965  J. A. COLE  3,196,686
DEVICES FOR TRANSMITTING SIGNALS
Filed Feb. 27, 1962  3 Sheets-Sheet 3

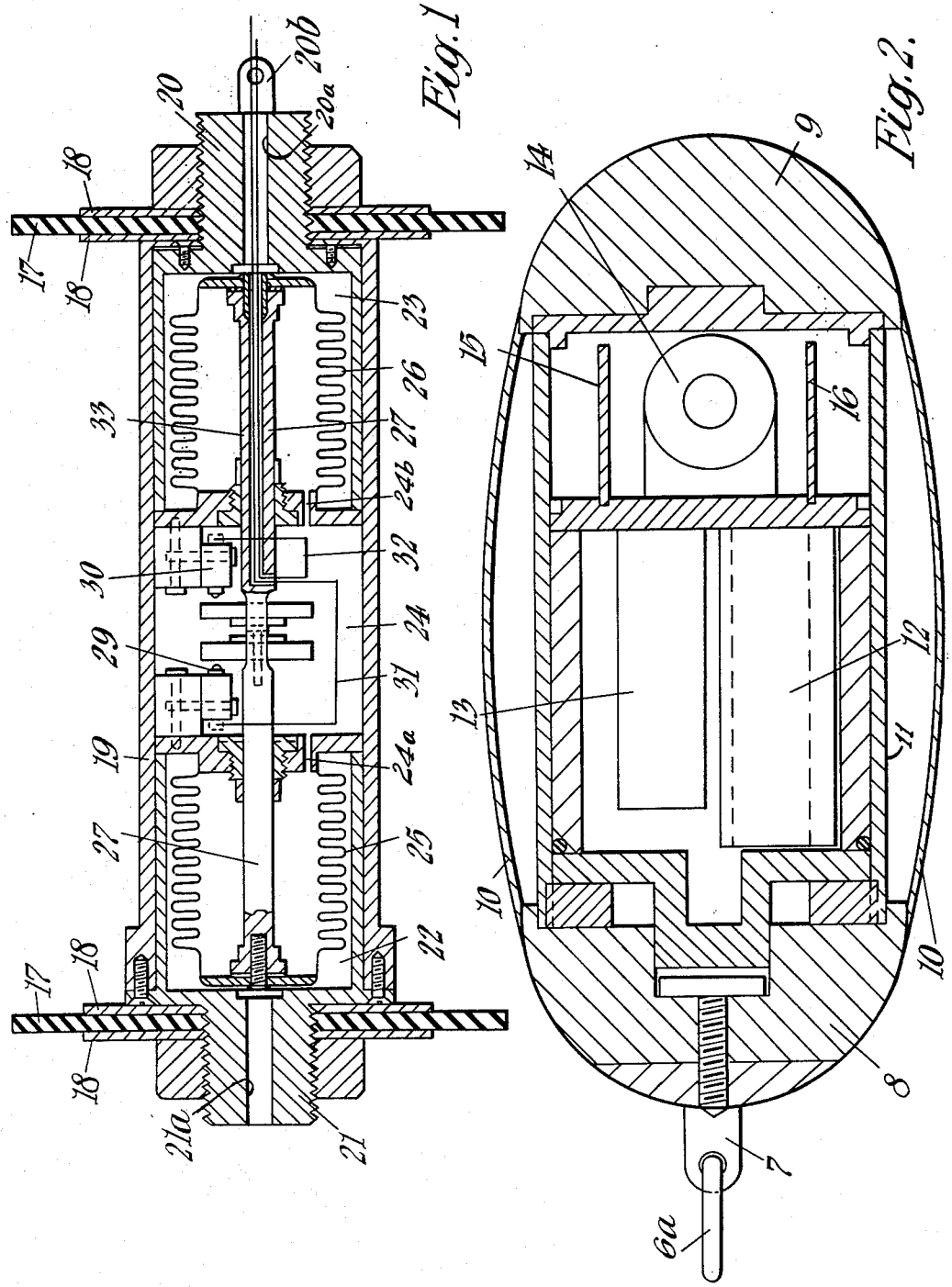

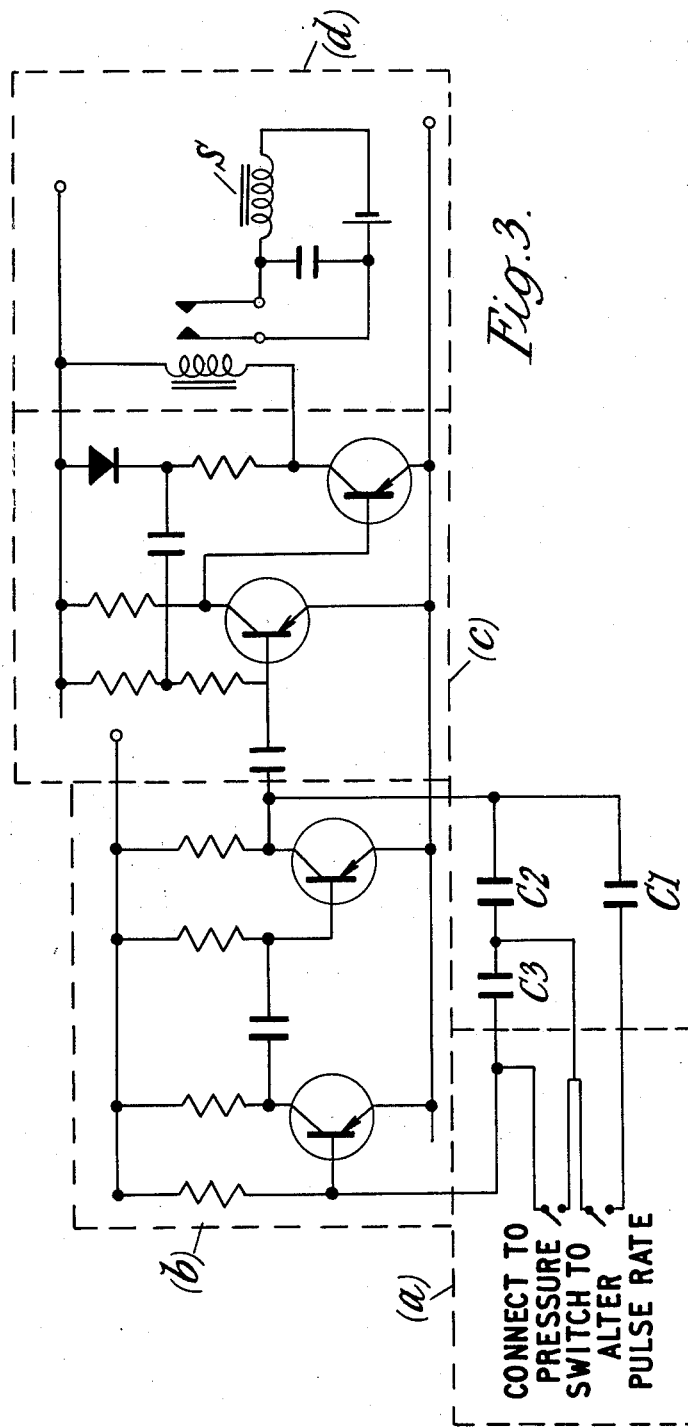
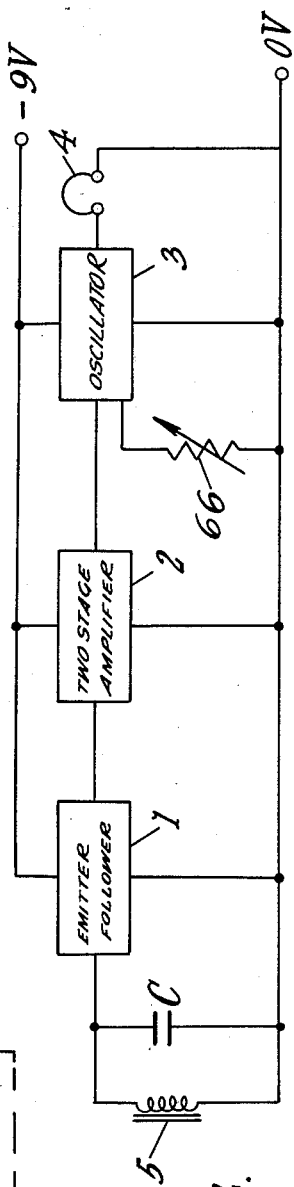
Fig.3.
Fig.4.

3,196,686
DEVICES FOR TRANSMITTING SIGNALS
John A. Cole, Henley-on-Thames, England, assignor to
The Water Research Association, Marlow, England
Filed Feb. 27, 1962, Ser. No. 176,023
Claims priority, application Great Britain, Mar. 3, 1961,
7,792/61
9 Claims. (Cl. 73—398)

This invention relates to devices for transmitting signals and has for its object to provide a convenient form of device which can be disposed within or propelled along the interior of a pipe, tube, conduit or other enclosure and which enables signals to be transmitted to a detector device situated outside the pipe or enclosure. The invention can be employed to particular advantage with pipes or the like of ferrous material, but is not restricted to such uses.

Devices for cleaning pipes etc. known as "ferrets," "pigs" or "go-devils" are known in themselves but are not much used since if they should stop in the pipe they are difficult and expensive to find and recover.

The invention consists in a device for detecting leaks having means for creating a modulated or varying magnetic field capable of being detected outside the pipe or enclosure.

This magnetic field may be varied or modulated in response to pressure or the flow conditions within the pipe, so that for example leaks may be located by detecting and interpreting the signals received.

The invention also consists in a device according to the preceding two paragraphs including means responsive to pressure or flow conditions in the pipe or the like to change the frequency of the modulated or varying field in accordance with changes in said conditions.

The invention also consists in the combination with a device in accordance with any of the three preceding paragraphs located in a pipe, tube or the like, of a detecting means, e.g. one or more electrical coils, located outside said pipe or the like, the arrangement being for instance such that an alternating or intermittent voltage which can be amplified for the purpose of detection or measurement is induced in the detection means when the magnetic field is modulated or varied.

The detection means is preferably, but not essentially, an inductive coil. It may also be, for example, a Hall effect detector or a suitable magnetometer.

The modulated or varying magnetic field can be created in a variety of ways, and in one form of the invention a permanent magnet associated with the device is given a rotary or other movement by motive means such as for example, an electric motor or a liquid driven mechanism. Instead of a permanent magnet an intermittently operated solenoid may be employed.

In a convenient arrangement for transmitting information regarding pressure or flow conditions in the pipe or tube, the device is provided with a pressure differential switch or a pressure differential strain gauge arranged to be responsive to variations in pressure across a diaphragm situated transversely with respect to the pipe: accordingly the frequency of modulation of the magnetic field may be varied as for example by varying the speed of the motive means driving the magnet.

In carrying the invention into effect for the purpose of locating a leak in a pipe, a device is provided with a pressure differential operated switch or a pressure differential operated strain gauge mounted in the casing and arranged so as to respond to variations in the pressure difference across the driving piston to which the device is attached. The switch or strain gauge is included in or associated with the circuit of the driving motor in such a manner that variations of a predetermined extent in such pressure difference will e.g. vary the speed of rotation of the motor and thus the frequency of modulation of the magnetic field produced by the rotating magnet. With this arrangement the device will show whether or not the fluid pressures on opposite sides of the driving piston are balanced or otherwise. When using the device to detect the position of a leak in a length of pipe the device is brought into a balanced condition by appropriate adjustment of the pressures at two accessible points in the said length of pipe. The rate of flow of liquid or fluid into the pipe is then measured with the device in stationary or balanced condition at different points along the length thereof, and any discontinuities in a series of such measured rates will then indicate the position of a leak.

The invention is not restricted to the examples described and it will be understood that the device need not include cleaning or scraping devices, as for example in a device intended solely for leakage detection. The invention is intended particularly for use in pipes as employed by the water and oil industries, but is not restricted to such uses.

The invention will be further described with reference to the accompanying drawings which show an alternative embodiment using a solenoid, and in which:

FIGURE 1 is a longitudinal section through an embodiment of a ferret provided with pressure sensitive means;

FIGURE 2 shows a transmitter assembly for use with the embodiment of FIGURE 1;

FIGURE 3 is the circuit diagram of a transmitter which may be used in conjunction with the embodiment of FIGURE 2;

FIGURE 4 is the circuit diagram of the corresponding detector.

Figure 5:
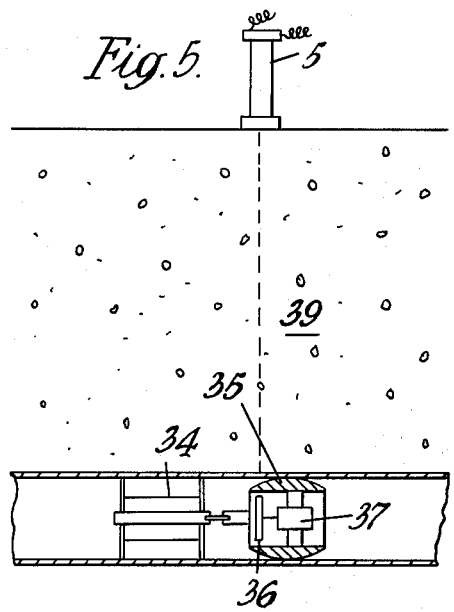
FIGURE 5 shows diagrammatically the geometrical arrangement of a rotating magnet transmitter and detector coil (of course the overall arrangement for a solenoid transmitter will be identical)

In FIG. 1a a construction of a ferret is shown which, in combination with a transmitting assembly and circuit of FIGS. 2 and 3, allows for leak detection.

In this embodiment, a rubber disc 17 clamped between plates 18 is provided at each end of the ferret, which in this case has a cylindrical body 19 with narrower cylindrical ends 20 (into which eye 20b is fastened) and 21.

Within the cylinder defined by body 19 are two bellows compartments 22 and 23 and a central compartment 24. Each bellows compartment has within it a bellows (25, 26) mounted on one rigid rod (27) which passes through the central compartment and operates two microswitches (29, 30). Electric leads (31, 32) pass from the microswitches down through a central axial bore 33 in rod 27 and to a solenoid controlled transmitting circuit described in more detail below with reference to FIGURE 3. Central axial bore 33 is plugged with e.g. a thermosetting resin and thus the central compartment and the inside of the bellows are sealed off from the liquid.

Further holes 20a, 21a are formed in the cylindrical ends 20 and 21 respectively, and the two bellows compartments are connected to the central compartment by bleed holes 24a and 24b. It will be seen that the bellows are responsive to the difference between the liquid pressure at the forward end 21 of the ferret and the liquid pressure at the rear end 20 of the ferret.

Referring now to FIGURE 2, a flexible member 6a is provided which attaches to eye 20b. Flexible member 6 is connected at its other end to a similar eye 7 in one end of a transmitter assembly which has protective end caps 8 and 9 one of which (8) has eye 7 fixed to it.

The long sides of the transmitter assembly are defined by skids 10 which reduce friction with the wall of the main.

Within the transmitter assembly is a sealed cylindrical body 11 containing a battery compartment 12, a relay 13, a transmitter 14 (which is essentially solenoid S of FIGURE 3) and boards 15 and 16 upon which are mounted the various components of a transistorized pulse transmitting circuit, as described in more detail with reference to FIGURE 3.

For leak detection the device operates as follows:

The section of the water main containing the leak is isolated and the ferret is placed at a known position within the main. This is conveniently carried out by increasing the pressure on one side of the ferret so that it moves, and releasing the pressure (or equalising it from the other side) when the desired position is reached. Water is then pumped into each end of the section through a bypass pipe fitted with a flowmeter. It will be seen from FIGURE 1 that either switch 30, or switch 29 or neither switch may be closed, and normally the pressure of the water being pumped in at each end is chosen so that neither switch is closed. The flow rates are recorded when this state is reached.

The ferret is then moved along the main for a known distance by increasing the water pressure and similar readings are taken, and the process is then repeated along the main to give a series of readings. A sudden discontinuity in the readings indicates that the ferret has moved from one side to the other of a leak.

Of course, for leak detection alone it is not necessary that a cleaning ferret be used; any diaphragm across the main enabling the pressure-sensitive device to be moved will suffice.

FIGURE 3 shows a typical circuit which is capable of transmitting the pulses of varying frequencies which indicate when the pressures are balanced, or their direction of unbalance. It consists of four main portions:

(a) A switch device controlling the three capacitances $C_1$, $C_2$ and $C_3$ so that if the switch is open (as shown), $C_2$ and $C_3$ are in series and $C_1$ is out of the circuit. If it is closed in one direction, $C_1$ and $C_2$ are in parallel with each other and in series with $C_3$ and if it is closed in the other direction only $C_2$ is in circuit.

(b) A multivibrator timing circuit giving a pulse the frequency of which depends on the capacitance of the combination of $C_1$, $C_2$ and $C_3$ being used.

(c) A pulse width stage which amplifies the pulse to operate, (d) A transmitter stage giving out the varying magnetic field from an intermittently operable solenoid, S, which creates the magnetic field being detected, stage (c) in fact determines when the relay, opened by the amplified pulse of stage (b), shall close again.

The varying magnetic field transmitted may be detected by a circuit of the type shown in FIGURE 4, in which 1 is an emitter follower, 2 a two stage amplifier and 3 a 1000 c.p.s. oscillator. Other circuit elements are earphones 4, detector coil 5 and a bias control variable resistance 66.

The detector coil, which is tuned to 30 c./s. by a parallel condenser, transforms the small magnetic field from the transmitter into a voltage of similar form.

The emitter follower matches the coil to the amplifier where the coil output voltage is amplified to a level suitable for switching on the 1000 c./s. oscillator which, under no signal conditions, is just biased off by the bias control.

When the oscillator is switched on the operator hears a 1000 c./s. note modulated by the 30 c./s. signal from the transmitter.

By way of example, with the external circuit working at 9 v., 1 may be the twin emitter follower TS17, 2 the wide band amplifier TS3 and 3 the 1000 c./s. oscillator TS1, of Venner Electronics, Ltd., Kingston-by-Pass, New Malden, Surrey, England.

Figure 6:
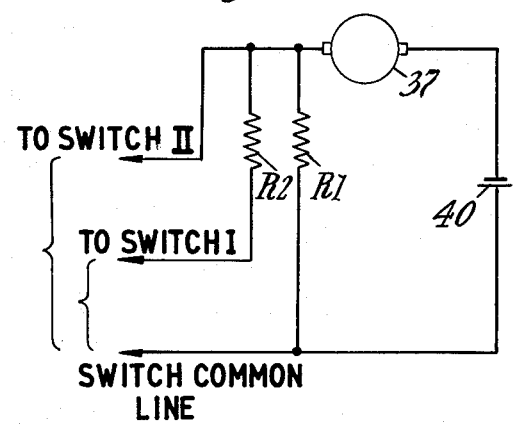
FIGURE 6 shows the circuitry for driving the rotating magnet at different speeds when a differential pressure switch is used in the leak detector.

The geometrical arrangement of detector coil and transmitter is shown in FIG. 5, which shows the "ferret" of FIG. 2 (34) connected to a transmitter 35 which uses a rotating permanent magnet 36 driven by motor 37, the whole being enclosed in pipe 38 embedded in earth 39. The detector coil 5 is directly above the rotating magnet. Of course the embodiment in which the transmitter uses a solenoid will be arranged in the same fashion when in use. The circuitry enabling the motor 37 to run at different speeds is shown in FIG. 6, and consists of battery 40 and resistance $R_1$ and $R_2$. When neither switch is closed, $R_1$ is in circuit; when switch I is closed $R_1$ and $R_2$ are in parallel; and when switch II is closed neither resistance is in circuit.

Figure 8:
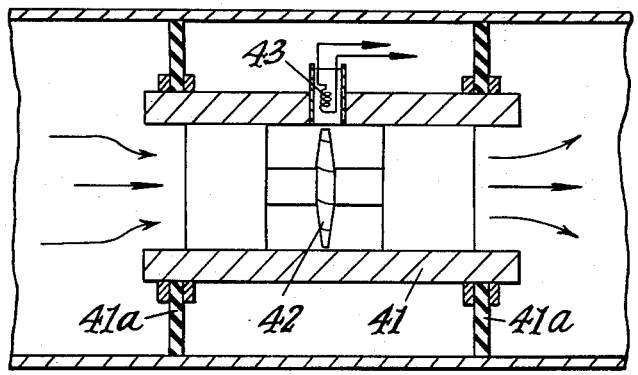
FIGURE 8 shows a flow-meter for direct measurement of leakage.

Various modifications may be made within the scope of the invention as defined in the appended claims and as described above, thus, the invention, although primarily intended for use in water mains may also be used in e.g. oil pipe-lines. Moreover by, for example, leaving a channel down the middle of a ferret within which channel a flow-meter is positioned, leaks may be detected by transmitting information about the flow conditions, which are used to control a varying or modulated magnetic field. Such a flow-meter is shown in FIG. 8 in which ferret 41 fitted with the usual sealing discs 41a has a central hole provided in it within which hole a turbine flow-meter 42 is positioned. The current generated by this in coil 43 may be used to control the rotation of a magnet or the operation of a relay-operated solenoid as before.

Figure 7:
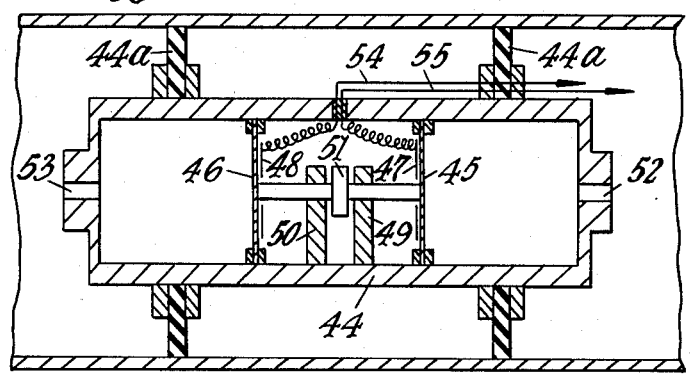
FIGURE 7 shows the main constructional features of a leak detector using strain gauges instead of a pressure-differential switch.

Moreover, as mentioned above, strain gauges may be used instead of pressure differential switches. Such an embodiment is shown diagrammatically in FIG. 7, wherein ferret 44, fitted with the usual sealing discs 44a has two diaphragms 45 and 46 within it to which strain gauges 47 and 48 are bonded.

Over-pressure stops 49 and 50 and abutment 51 are provided to prevent damage to the ferret, the inside of which communicates with the liquid in the main by orifices 52 and 53. Leads 54 and 55 connect the strain gauges to circuitry such as that shown in FIG. 3.

I claim:

1. In a device adapted to be disposed within the interior of a longitudinally extending fluid flow system, means for creating a magnetic field of such strength as to be detectable outside the system, means responsive to pressure conditions within said system connected to said means for creating a magnetic field to effect the modulation of the magnetic field in accordance with said pressure conditions, means situated outside the system for detecting the modulated magnetic field and rendering a pressure condition readout in terms of said field, said device further including portions disposed transversely across the interior of said system to effect the movement of said device within the system by means of fluid flow acting on said portions.

2. In a device adapted to be disposed within the interior of a longitudinally extending fluid flow system, means for creating a varying magnetic field of such strength as to be detectable outside the system, means responsive to pressure conditions within said system connected to said means for creating a magnetic field in accordance with said pressure conditions by changing the frequency of the varying magnetic field, means situated outside the system for detecting the modulated magnetic field and rendering a pressure condition readout in terms of said field, said device further including portions disposed transversely across the interior of said system to effect the movement of said device within the system by means of fluid flow acting on said portions.

3. In a device adapted to be disposed within the interior of a longitudinally extending fluid flow system, a movable magnet for creating a magnetic field of such strength as to be detectable outside the system, means responsive to pressure conditions within said system connected to said magnet to change the frequency of movement of the magnet in accordance with said pressure conditions, so as to effect modulation of the magnetic field, means situated outside the system for detecting the modulated magnetic field and rendering a pressure condition readout in terms of said field, said device further including portions disposed transversely across the interior of said system to effect movement of said device within the system by means of fluid flow acting on said portions.

4. In a device adapted to be disposed within the interior of a longitudinally extending fluid flow system, a rotatable permanent bar magnet mounted for rotation about an axis perpendicular to its axis for creating a varying magnetic field of such strength as to be detectable outside the system, means responsive to pressure conditions within said system connected to said magnet to effect modulation of the magnetic field in accordance with said pressure conditions by changing the frequency of rotation of the magnet, means situated outside the system for detecting the modulated magnetic field and rendering a pressure condition readout in terms of said field, said device further including portions disposed transversely across the interior of said system to effect movement of said device within the system by means of fluid flow acting on said portions.

5. In a device adapted to be disposed within the interior of a longitudinally extending fluid flow system, a solenoid, means providing a supply of direct current to said solenoid for creating a megnetic field of such strength as to be detectable outside the system and including an electrical circuit adapted to intermittently connect and disconnect the solenoid to the means for supplying direct current, means responsive to pressure conditions within said system electrically connected in said circuit to effect modulation of the magnetic field in accordance with said pressure conditions by changing the frequency of said connection and disconnection of the solenoid to the means supplying direct current, means situated outside the system for detecting the modulated magnetic field and rendering a pressure connection readout in terms of said field, said device further including portions disposed transversely across the interior of said system to effect movement of said device within the system by means of fluid flow acting on said portions.

6. In a device adapted to be disposed within the interior of a longitudinally extending fluid flow system, a rotatable permanent bar magnet mounted for rotation about an axis perpendicular to its magnetic axis for creating a varying magnetic field of such strength as to be detectable outside the system, a diaphragm movable in response to pressure conditions within said system, means actuatable by the movement of said diaphragm and connected to said magnet to effect modulation of the magnetic field in accordance with said pressure conditions by changing the frequency of rotation of said magnet, means situated outside the system for detecting the modulated magnetic field and rendering a pressure condition readout in terms of said field, said device further including portions disposed transversely across the interior of said system to effect movement of said device within the system by means of fluid flow acting on said portions.

7. In a device adapted to be disposed within the interior of a longitudinally extending fluid flow system, a solenoid, means providing a supply of direct current to said solenoid for creating a magnetic field of such strength as to be detectable outside the system and including an electrical circuit adapted to intermittently connect and disconnect the solenoid to the means for supplying direct current, a movable diaphragm movable in response to pressure conditions within said system, switching means in said electrical circuit actuatable by the movement of said diaphragm to effect modulation of the magnetic field in accordance with said pressure conditions by changing the frequency of said connection and disconnection of the solenoid to the means supplying direct current, means situated outside the system for detecting the modulated magnetic field and rendering a pressure condition readout in terms of said field, said device further including portions disposed transversely across the interior of said system to effect movement of said device within the system by means of fluid flow acting on said portions.

8. In a device as claimed in claim 7 and said diaphragm comprising a bellows.

9. In a device adapted to be disposed within the interior of a longitudinally extending fluid flow system, a solenoid, means providing a supply of direct current to said solenoid for creating a magnetic field of such strength as to be detectable outside the system and including an electrical circuit adapted to intermittently connect and disconnect the solenoid to the means for supplying direct current, a movable diaphragm means movable in response to the pressure differential between two points in said system, switching means in said electrical circuit actuatable by the movement of said diaphragm to effect modulation of the magnetic field in accordance with said pressure conditions by changing the frequency of said connection and disconnection of the solenoid to the means supplying direct current, means situated outside the system for detecting the modulated magnetic field and rendering a pressure condition readout in terms of said field, said device further including portions disposed transversely across the interior of said system to effect movement of said device within the system by means of fluid flow acting on said portions.

References Cited by the Examiner
UNITED STATES PATENTS

| | | | |
|---|---|---|---|
| 2,558,977 | 7/51 | Pearson | 15—104.06 |
| 2,601,248 | 6/52 | Brenholdt | 15—104.06 |
| 2,617,134 | 11/52 | Barton | 15—104.06 |
| 2,884,624 | 4/59 | Dean et al. | 340—282 |
| 2,924,966 | 2/60 | Dean et al. | 73—40.5 |
| 3,002,384 | 10/61 | MacDonald et al. | 73—231 |
| 3,016,733 | 1/62 | Dean et al. | 73—40.5 |
| 3,029,643 | 4/62 | Stern | 73—398 |
| 3,053,087 | 9/62 | Waugh | 73—231 |
| 3,062,052 | 11/62 | Kolb | 73—398 |

RICHARD C. QUEISSER, *Primary Examiner.*

CHARLES M. WILLMUTH, JOSEPH P. STRIZAK,
*Examiners.*